(12) United States Patent
Gunther

(10) Patent No.: US 7,446,681 B2
(45) Date of Patent: Nov. 4, 2008

(54) LOOKUP TABLE ARRAY COMPRESSION AND INDEXING

(75) Inventor: Bernard Karl Gunther, Adelaide (AU)

(73) Assignee: Freescale Semiconductor, Inc., Houston, TX (US)

( * ) Notice: Subject to any disclaimer, the term of this patent is extended or adjusted under 35 U.S.C. 154(b) by 314 days.

(21) Appl. No.: 11/424,064

(22) Filed: Jun. 14, 2006

(65) Prior Publication Data

US 2007/0294502 A1 Dec. 20, 2007

(51) Int. Cl.
*H03M 7/00* (2006.01)
(52) U.S. Cl. .......................... 341/106; 341/87
(58) Field of Classification Search .............. 341/106, 341/87, 65
See application file for complete search history.

(56) References Cited

U.S. PATENT DOCUMENTS

| | | | | |
|---|---|---|---|---|
| 5,945,933 | A * | 8/1999 | Kalkstein | 341/63 |
| 6,011,795 | A | 1/2000 | Varghese et al. | |
| 6,631,419 | B1 | 10/2003 | Greene | |
| 6,756,922 | B2 * | 6/2004 | Ossia | 341/51 |
| 6,888,838 | B1 | 5/2005 | Ji et al. | |
| 7,079,056 | B2 * | 7/2006 | Weaver | 341/106 |
| 7,333,037 | B2 * | 2/2008 | Cheng | 341/67 |
| 2004/0111439 | A1 | 6/2004 | Richardson et al. | |
| 2004/0167923 | A1 | 8/2004 | Carr | |

OTHER PUBLICATIONS

Miguel Ruiz-Sanchez, et al., Survey and Taxonomy of IP Address Lookup, Algorithms, IEEE Network Magazine, Mar. 2001, pp. 8-23.

* cited by examiner

*Primary Examiner*—Brian Young
(74) *Attorney, Agent, or Firm*—Charles Bergere

(57) ABSTRACT

A method of constructing, from a first array of entries, a second array of entries having a reduced number of entries compared with the first array is disclosed. According to one embodiment, the method comprises partitioning the first array into one or more groups of entries and then categorizing each group with a category categorizing relationships between entries of a respective group, or entries of a respective group and entries of another group. A compression code is then formed that contains a sequence of coded identifiers, each identifier identifying the category of a respective group. Finally, the second array is constructed to include selected entries from the first array. The selected entries depend on the category of each group and are arranged so as to be indexable by processing a first index into the first array and the compression code to derive a second index for retrieving an equivalent entry from the second array without decompressing the second array.

19 Claims, 15 Drawing Sheets

First Subtable:
[AAAAAAAABBBBBBBBCCDDDDDDDDDDEFGHHHHHHHHHBBBBBBBBJJJJJJJJJJJJJJJJ]

Number of entries: 64

Size (SHL) = $\log_2 64$
= 6
Compression Code Size = 32 bits
Number of dibits (NDB) = 16 dibits
= $2^4$ dibits Group Size = $2^{SHL-NDB}$
= $2^{6-4}$
= 4

Partitioned First Array:
[AAAA AAAA BBBB BBBB CCDD DDDD DDDD EFGH HHHH HHHH BBBB BBBB JJJJ JJJJ JJJJ JJJJ]

Compression Code: "01.00.01.00.11.00.00.11.00.00.01.00.01.00.00.00"  ← 312

Compressed Subtable: [A B CCDD EFGH B J]  ← 308

FIG.5

First Subtable: 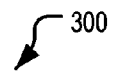
[ABCDDDDDDDEEEEFFFFFFGHHIIIJJJJJJJJJJKKKKKKKKKKLLLLLLLLMMMMMMMMMM]

Number of entries: 64

Size (SHL) = $\log_2 64$
= 6

Compression Code Size = 32 bits
Number of dibits (NDB) = 16 dibits
= $2^4$ dibits

Group Size = $2^{SHL-NDB}$
= $2^{6-4}$
= 4

Partitioned First Array:
[ABCD DDDD DDEE EEFF FFFF GHHI IIJJ JJJJ JJJJ KKKK KKKK KKLL LLLL LLMM MMMM MMMM]

Compression Code: "11.00.10.10.00.11.10.00.00.01.00.10.00.10.00.00" 

Compressed Subtable: [ABCD EE FF GHHI JJ K L MM] 

FIG.6

First Subtable:

[AABB CDDD EEEE FFFF GGGH IIII JJJJ KKKK LLLL LMMM NNNN OOOO PPPP QQQR SSSS TTTT] 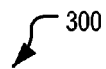 300

Number of entries: 64

Size (SHL)    = $\log_2 64$
                 = 6

Compression Code Size    = 32 bits
Number of dibits (NDB)    = 16 dibits
                              = $2^4$ dibits

Group Size   =   $2^{SHL-NDB}$
               =   $2^{6-4}$
               =   4

Partitioned First Array:

[AABB CDDD EEEE FFFF GGGH IIII JJJJ KKKK LLLL LMMM NNNN OOOO PPPP QQQR SSSS TTTT]

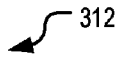 312

Compression Code: "11.11.01.01.11.01.01.01.01.11.01.01.01.11.01.01"

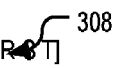 308

Compressed Subtable:       [AABB CDDD E F GGGH I J K L LMMM N O P QQQR S T]

FIG.7

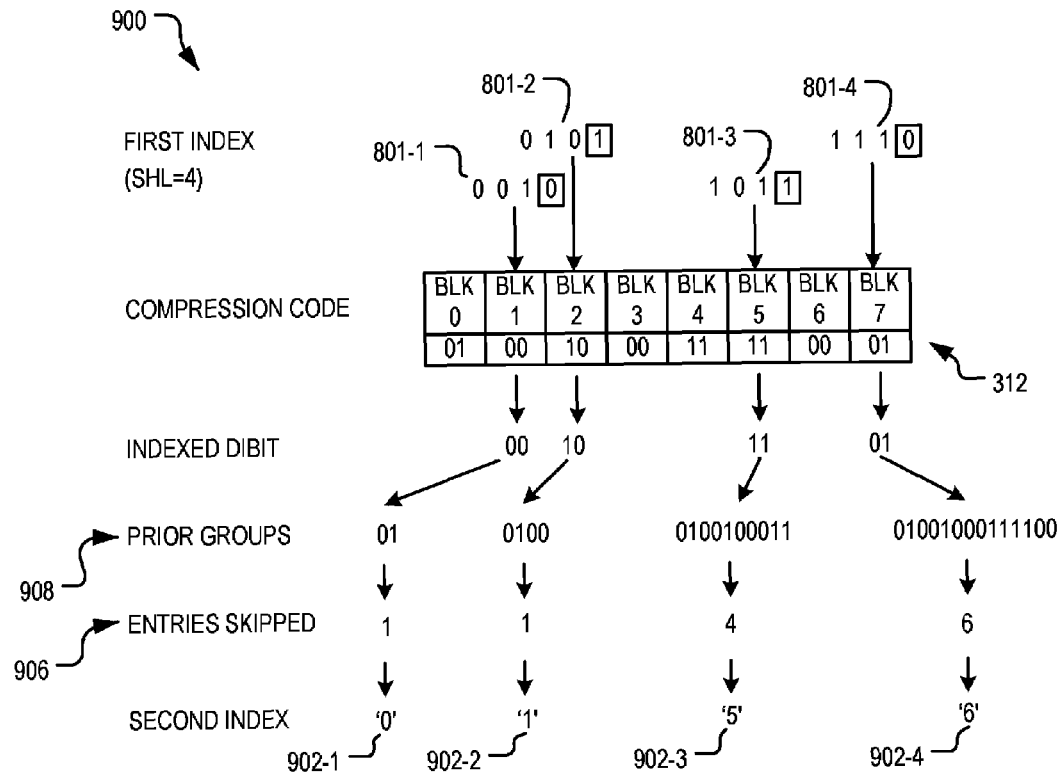
FIG.9A
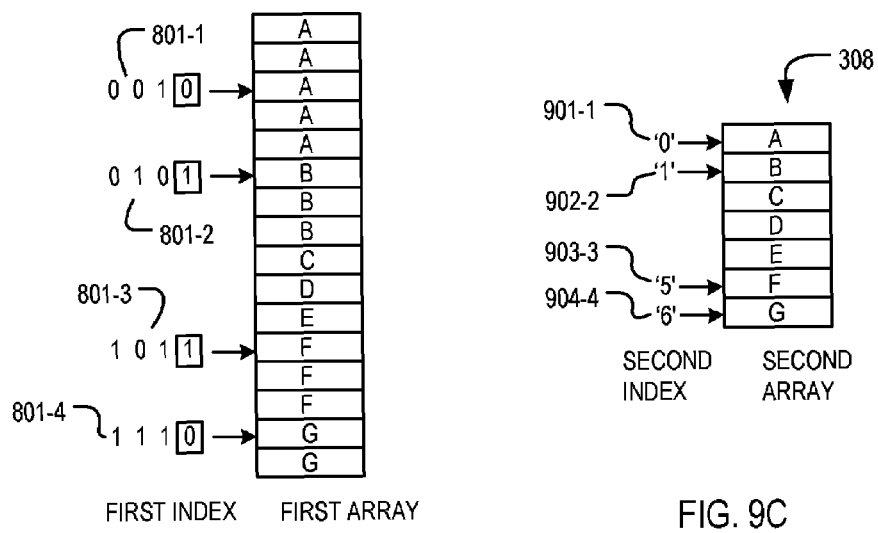
FIG. 9B
FIG. 9C

```
// Compressed Radix Trie search algorithm for longest prefix tables
entry.ETYPE = SIMPLE;  // Initialize SIMPLE table type to begin with always
entry.BASE = 0;        // Initial table starts at index 0 of tableSpace
entry.KEYSHL = 16;     // Start at L1 table shift of 16 bits
// Main traversal loop
while (entry.ETYPE == SIMPLE || entry.ETYPE == RUNDELTA) {
      shl = entry.KEYSHL + 1;
      // extract shl MSBs from searchKey
      keyBits = high_order_bits(searchKey, shl);
      // index next subtable according to entry data and high order key bits
      if (entry.ETYPE == RUNDELTA)
            index = entry.BASE + offset_RUNDELTA(entry.ENTROPY, keyBits, shl);
      else
            index = entry.BASE + keyBits;
      // get next entry according to final index
      entry = tableSpace[index];
      // shift key left
      searchKey = searchKey << shl;
}
// Check reason for loop to terminate: return result or fail otherwise
if (entry.ETYPE == DATA)
return tableSpace[entry.BASE];
else
return keyNotFound;
```

FIG.11A

```
int
offset_RUNDELTA(unsigned int entropy, unsigned int keyBits, int keyShl) {
    unsigned int  blknum_by2, entropy_mask, dibit_highbits;
    int           entries_skipped;

// blknum_by2 = 2 * current block index, which skips bits of ENTROPY
    blknum_by2      = (keyBits >> (keyShl-4)) << 1;
    // duplicate high-order bit of each dibit to distinguish dibit type
    dibit_highbits  = entropy & 0xaaaaaaaa;    // mask high bits
    dibit_highbits |= dibit_highbits >> 1;      // shift and duplicate
    // mask out all ENTROPY bits except those left of current block
    entropy_mask    = ~((unsigned int)0xffffffff >> blknum_by2);
    // we've skipped both 1 and half/full entries per block cases: count total
    entries_skipped =
        popcount(entropy & ~dibit_highbits & entropy_mask) +
        (popcount(entropy &  dibit_highbits & entropy_mask) << (keyShl-5));

// index last stored entry or current block according to current dibit
    switch ((entropy >> (30 - blknum_by2)) & 3) {
        case 0:       return entries_skipped - 1;
        case 1:       return entries_skipped;
        case 2:       return (keyBits & (1 << (keyShl-5)))?
                             entries_skipped + (keyBits & ~(~0 << (keyShl-5))) :
                             entries_skipped - 1;
        case 3:       return entries_skipped + (keyBits & ~(~0 << (keyShl-4)));
    }
}
```

FIG.11B

First Array:
[ABCD DDDD DDEE EEFF FFFF GHHI IIJJ JJJJ JJJJ KKKK KKKK KKLL LLLL LLMM MMMM MMMM]

SHL: 6 (uncompressed size 64; block size = $2^{SHL-4}$ = 4)

First Index: 0 1 1 0 

801          312

Compression Code:
"11.00.10.10.00.11.10.00.00.01.00.10.00.10.00.00"

Compressed Array :
[ABCD EE FF GHHI JJ K LL MM]
308

Code Execution:
  entropy = 0xCA381220
  keyBits = 27
  keyShl = 6
  block number = 27 >> (6-4) = 6
  blknum_by2 = 12
  entropy_mask = 0xFFF0000
  dibit_highbits = "11.00.11.11.00.11.11.00.00.00.00.11.00.11.00.00"
  ~dibit_highbits = "00.11.00.00.11.00.00.11.11.11.11.00.11.00.11.11"
  entries_skipped = popcount(0xCA300000)*2 + popcount(0x0) = 12
  indexed dibit = "10" (skip half, store half uncompressed), keyBits & "11" = 3 ≥ $2^1$
  offset_RUNDELTA = entries_skipped + 1 = 13

Second Index: 13
901

FIG.12

LOOKUP TABLE ARRAY COMPRESSION AND INDEXING

FIELD OF THE INVENTION

The present invention relates to methods and systems for compressing an array of entries and indexing into a compressed array. In a typical application, an embodiment of the present invention may be used to compress arrays, or tables, containing highly redundant data, such as radix trie data tables used for longest matching prefix determination in communication networks.

BACKGROUND OF THE INVENTION

Arrays are a form of data structure that typically hold entries of the same data type. Each entry in an array will typically have a specific value, from a range of values associated with a data type, and will be retrievable by indexing a search key into the array.

Arrays often store a large number of entries, and where an array is stored in computer readable memory, as the number of entries increases, so too does the memory resources allocated to store those entries.

One type of array that often holds a large number of entries, and thus occupies substantial memory resources, includes route tables for performing a look up of a route associated with an Internet Protocol (IP) address. Such route tables are typically stored in memory on board Internet routers that forward IP packets to a destination given by a destination IP address field in a packet header. As will be understood, an IP address comprises binary 1's and 0's which the Internet router "looks up" in its route table to determine which adjacent router or network is able to carry the IP packet through to its destination.

Since the structure of the Internet, and in turn IP addresses, is hierarchical, a subset of the IP address, the left-most bits called the prefix, uniquely identifies a subnetwork of many computers or a subnetwork of further smaller networks themselves connected to many computers. The problem of finding a route then consists of matching the most specific or longest prefix in the route table to the destination IP address found in a packet. Such a look up is often referred to as "longest prefix matching" and the associated route tables as "longest prefix match tables".

By way of example, a 32-bit IP (IP version 4) address of 162.122.14.20 might be the IP address of a particular computer on the Internet (expressed as four 8-bit numbers in dot notation), but any IP packet addressed to 162.122.14.* (that is, addresses 162.122.14.1 through 162.122.14.255) would reach the sub-network of 255 computers of which 162.122.14.20 is a member. That is, the 24-bit address prefix of 162.122.14.* uniquely locates this sub-network. We might also find, however, that any IP address prefixed by the 8-bit prefix 162.*.*.* locates all computers in a broad geographical region.

One popular data structure for a route table facilitating longest-prefix matching is a multi-way or radix trie. A radix trie consists of a collection of tables containing table entries that are indexed by a multi-bit part of an IP address ("the look up key"). Each table entry either points to next-hop route data (that is, the result of a route), or points to another table—a subtable that covers routes of prefixes longer than that of the parent table. A lookup is typically performed by indexing a first level table with a fixed number of address bits, and then continuing to index lower level subtables with subsequent bits of the address until the lookup finds next-hop data or fails.

In practice, the lookup key may not be split into digits of equal radix or size. Typically, the first digit is of much larger radix (16-bits or 65536 is common) than the digits to the right, as this allows a large first-level table of which there is only one instance.

Each time another group of address bits is consumed, the look up descends into a deeper level (L2, L3, etc.) of the trie. By way of example, suppose a trie had only three levels; in this case, 16 bits might be consumed for indexing the L1 table, 8 bits for indexing each L2 subtable, of which there may be many instances, and the last 8-bits of the 32-bit address for indexing each L3 subtable. Different breakdowns of IP addresses into levels of the trie are possible, but a 16/8/8 split of bits has proven effective with "real" IP route data.

Whilst radix tries offer fast lookups, for example at most three lookups (for L1, L2, and L3) per 32-bit address, they suffer the disadvantage of being very large compared to the amount of data they hold. One of the reasons for this is a phenomenon called "prefix expansion". Prefix expansion is caused by taking prefixes whose length does not neatly fit the L1, L2, etc. breakdown and expanding them artificially into replicated entries that can be indexed directly given the fixed structure. For example, a 21-bit address prefix does not fit the 24-bit prefix located at L2 for a 16/8-bit L1/L2 structure, hence a single 21-bit prefix is replicated eight times to expand it to eight 24-bit prefixes. This expansion phenomenon particularly affects the economics of placing radix tries in fast memories, such as costly Static Random Access Memory (SRAM).

There is a need for methods and systems that compress arrays, such as radix tries, without affecting the speed of lookups. There is also a need to provide methods and systems that permit Internet routers, and similar devices, to exploit the performance advantage of SRAM while minimizing hardware costs.

SUMMARY OF THE INVENTION

The present invention provides a method of constructing, from a first array of entries, a second array of entries having a reduced number of entries compared with the first array, but that is indexable to retrieve an entry that is equivalent to an indexed entry of the first array without decompression of the second array.

In one embodiment, the method comprises:

partitioning the first array into one or more groups of entries;

categorizing each group with a category categorizing relationships between entries of a respective group, or entries of a respective group and at least one entry of another group;

forming a compression code containing a sequence of coded identifiers, each identifier identifying the category of a respective group; and constructing the second array to include selected entries from the first array, the selected entries depending on the category of each group and arranged so as to be indexable by processing a first index into the first array and the compression code to derive a second index for retrieving an entry from the second array that is equivalent to the indexed entry of the first array, without decompressing the second array.

Throughout this specification references to "array" are to be understood to be a reference to any single dimension data structure holding entries of the same data type.

Typically, an array will be arranged either as a row, or a column, of array entries. The first array may be an array that, as a result of its construction, contains highly redundant data.

The data type of the array entries will vary according to the type or purpose of the first array. For example, the array entries may include data elements having a data type that is interpretable to define route information for an IP address look up process, such as route tables in the form of radix-tries. In this respect, for the remainder of this description the first array will be exemplified in terms of an array containing route information for performing an IP address "look up".

Although the remainder of the description will exemplify embodiments that relate to radix-tries, and in particular to applications for finding a longest prefix matching radix-trie, it is to be appreciated that the first array may contain entries having other data types. For example, in another embodiment the first array contains entries that collectively define a sequence, such as a nucleic acid sequences or a protein sequence. Other types of sequences may also be stored. Thus, as is illustrated by the preceding examples, it is to be understood that embodiments of the present invention are not to be restricted to applications relating to looking up an IP address route. Indeed, it is envisaged that embodiments of the present invention will have wide ranging application and thus it is also contemplated that the type of the first array, and thus the type of the entries contained therein, will be equally wide ranging. However, the present invention is particularly applicable to applications that relate to route table radix-tries, and specifically a radix-trie, since such tries typically hold a significant amount of redundant data by virtue of their construction.

The partitioning of the first array will typically depend on one or more characteristics of the first array. In an embodiment, one suitable characteristic includes the number of entries in the first array, in which case the partitioning of the array may include partitioning the first array into substantially equal sized groups of entries. In this respect, references to "equal sized", where used in relation to groups of entries, are to be understood as a reference to each group in the first array as containing the same number of entries. As will be appreciated, where the first array holds an odd number of entries, one group in the array will have a lesser number of entries as compared to the other groups, which will have an equal same size. In such circumstances, for the purpose of this specification, all of the groups of the first array will be considered as having substantially equal sized groups of entries.

For a first array containing an even number N of entries, the partitioning of the first array into equal sized groups may be achieved by partitioning the first array into M groups, each group containing N/M entries.

Although it is not essential that the first array be partitioned into equal sized groups, it is preferred that that first array be so partitioned since such partitioning reduces the processing time associated with deriving the index into the second array. Ideally, each group will have a fixed number of entries N/M, wherein M is a power of two, so that multiplication, or division, by M can be accomplished via an appropriate binary shift operation, since such operations are computationally economic. Thus, for groups of fixed size N/M, a division operation may be used to identify the group G, and thus the respective identifier, of the first array containing an entry indexed by the index I into the first array, as G=I/M.

As described above, the first array may be partitioned in accordance with another suitable characteristic. For example, the partitioning of the first array may be based on the properties of sets of consecutive entries in the array. By way of example, the partitioning of the first array may be achieved by consecutively parsing the entries of the first array to identify one or more sets of consecutive entries having a particular property, and forming a group of entries from each so identified set.

A property of a set may include each entry in a set having a particular value, or a particular relationship with the other entries of that set or another set of entries. As will be appreciated, where an array is partitioned on the basis of such properties, the groupings may not be of an equal size. The particular value or relationship will vary according to the type of entries in the first array. For example, where the first array includes numerical entries, the particular relationship between the entries of a set may include a numerical relationship, such as a series relationship, an ordered relationship, an arithmetic relationship or an equal relationship. In this respect, where used throughout this specification, references to "equal relationship" are to be understood to mean a relationship that exists between identical entries. On the other hand, where the first array includes alphabetic entries, or alphanumeric, entries the particular relationship may simply include an equal relationship. Throughout this specification, references to the term "alphabetic entry" are to be understood to be a reference to an array entry consisting of a single alphabetic character or a string of alphabetic characters. In addition, references to the term "alphanumeric entry" are to be understood to be a reference to an entry consisting of a string of alphabetic and numerical characters.

Categorizing each group with a category categorizing relationships between entries of a respective group, or entries of a respective group and entries of another group, may be performed by any suitable process. For example, categorizing may include processing entries in a group to identify relationships between entries of that group, or the entries of that group and at least one entry of another group, and then identifying the category categorizing, or associated with, that relationship.

In terms of identifying relationships between the entries of a respective group and at least one entry of another group, categorizing may include comparing some or all of the entries in a respective group with at least one entry of another group to identify a relationship between the entries of those groups. For example, categorizing may include comparing some of the entries in a respective group with one or more entries of a preceding or subsequent one of the groups to identify similarities between some, or all of the entries contained therein.

In an embodiment, categorizing each group with a category categorizing relationships between entries of a respective group and at least one entry of another group comprises identifying relationships between the entries of a sub-group of the respective group and a single entry of another group. In an embodiment, categorizing a group on the basis of categorizing relationships between sub-groups of that group, and possibly an entry of another group, entails dividing the respective group into two equal sized sub-groups, namely a first sub-group and a second-sub-group, and if either all of the entries of the first sub-group or the second-sub-group are equal, categorizing the group accordingly. Furthermore, if entries of the sub-group containing equal entries are the same as the final entry in the immediately preceding group, or the immediately following group, the entire group will be classified accordingly.

Any suitable number or types of categories may be used to categorize a group. In an embodiment that categorizes a group as one of four categories, a category may be selected from one or more of:

(a) a category categorizing that all of the entries in a group are identical;

(b) a category categorizing that at least some of consecutive entries of a group are identical;

(c) a category categorizing that at least some of consecutive entries in a group are identical with at least one entry of another group; and (d) a category categorizing that a group cannot be classified as any of the above categories.

It is not essential that all of the above categories be selectable. For example, one embodiment may use conjunctive categories, such as a first category categorizing that all of the entries in a group are identical and a second category categorizing that all of the entries in a group are not of the first category. However, the use of more than two categories is expected to provide improved compression as compared to an embodiment that uses only two categories. That is, the use of more than two categories is expected to provide a second array having a reduced number of entries compared to a second array that has been produced by categorizing groups of the first array using only two categories.

In embodiments that use more than two categories, the set of categories available for selection may vary between different embodiments. For example, in one embodiment that uses four categories the group categories may be attributed as follows:

(a) a group G is categorized as a first category (category "0") if all of its entries are identical to the last entry in the preceding group, (G−1);

(b) a group G is categorized as a second category (category "1") if all of its entries are identical to each other, but different to the last entry in the preceding group, G−1;

(c) a group G is categorized as a third category (category "2") if its first (N/2*M) entries are identical to each other and match the last entry in the preceding group, (G−1); and (d) any other group is categorized in a fourth category (category "3").

In one embodiment, relationships between the entries of each group, or between each group and at least one entry of another group, are established simultaneously. Then, each entry is analysed one entry at a time to update whether that entry preserves or destroys a relationship. For example, by checking whether the addition of an entry to a group of equality relationship breaks or preserves that relationship. After all entries in the group have been processed, the remaining relationships are examined to asses which of those are still in effect. Then, the relationship that allows a category with the smallest number of elements to be held in the second array is selected. For example, a single group may have all identical entries and, at the same time, also have entries that match the last entry of the preceding group; in this case, while both categories "0" and "1" are valid, category "0" is selected since it requires no elements in the second array, as opposed to a single element for category "1"

In terms of constructing a sequence of coded identifiers in which each identifier identifies the category of a respective group, one suitable coded identifier may include a binary coded identifier, in which a different binary coded identifier is assigned to and representative of a respective category. Another suitable identifier may include a single character identifier assigned to and representative of a respective category. Irrespective of the type of identifier used, each identifier will uniquely identify a respective category.

In terms of suitable binary coded identifiers, one suitable binary coded identifier may include a 2-bit binary identifier (hereinafter a "dibit" identifier) in which a different two bit binary code is assigned to and representative of a respective category. As will be appreciated, a dibit identifier may be used to represent up to four different categories. Thus where groups of the first array can be categorized as one of four groups, four different binary coded identifiers will be employed, one for each category. For example, in one embodiment that uses four categories, the category of each group may be represented using a 2-bit binary code as follows:

(a) category "0" is represented by the dibit identifier "00";

(b) category "1" is represented by the dibit identifier "01";

(c) category "2" is represented by the dibit identifier "10"; and (d) category "3" is represented by the dibit identifier "11".

As will be appreciated, other types, or structures, of coded identifiers may also be suitable. Although the present invention should not be considered as being restricted to employing binary coded identifiers of the type described above, the use of dibit binary coded identifiers provides computationally efficient indexing into, and thus retrieval of, an entry from a second array constructed in accordance with the above-described method embodiment. Other suitable coded identifiers may include a hexadecimal coded identifier, an octal coded identifier, or a binary coded decimal identifier.

The type and size of the coded identifier will vary according to the number of categories which may be selected to categorize a group. For example, where six categories are selectable, a 3-bit binary coded identifier may be required.

In addition to identifying the category of a group, each coded identifier will also have a structure or other characteristic that permits processing of coded identifiers to derive the second index. In an embodiment, processing of this type is employed to retrieve the "equivalent entry" from the second array. In this respect, in referring to the indexed entry of the second array as being "equivalent" to the index entry of the first array, we mean that the entry retrieved from the second array is the same as the entry of the first array indexed by the first index. The derivation of the second index may be performed by any suitable process. One suitable process will be explained in more detail later.

In addition to categorizing the category of a group, each coded identifier may also be indicative of the number of equivalent entries in the second group that have been selected from a respective group of the first array. Thus, it is preferred that the compression code be formed so that, in addition to identifying the category of each group, it also provides a means of identifying the number of equivalent entries in the second array that have been selected from the group of the first array categorized by the identifier. For example, where an identifier includes a binary coded identifier, the number of "set" bits in the identifier, and the location of the "set" bits, may be indicative of the number of equivalent entries in the second array that have been selected from the group categorized by the identifier. Such an arrangement is preferred since it may simplify the derivation of the second index. In addition, such an arrangement may permit a derivation process to be performed by a suitable hardware digital logic structures, such as a set of population counters. Alternatively, priority encoders and multi-operand adder chains may be used to derive the equivalent index into the second array.

By way of example, in one embodiment that uses four categories and dibit identifiers, and in the case of a category "0" group, the identifier "00" identifies that no entries from the respective group of the first array have been included in the second array. Similarly, for category "1" the identifier "01" identifies that a single entry from the respective group of the first array has been included in second array. Similarly, for category "2" the identifier "10" identifies that (N/2*M) entries from the respective group of the first array have been included in the second array. Finally, for category "3" the identifier "11" identifies that there 2*(N/2*M) entries from the respective group of the first array have been included in the second array. In other words, in this example the number of "set" bits in a coded identifier is indicative of the number of lots of (N/2*M) entries or lots of a single entry that have been selected from a respective group of the first array and included in the second array. As will be described later, such a scheme enables the use of simple, low cost hardware and software structures that are capable of performing high speed indexing and retrieval of an entry from the second array.

In an embodiment, forming the compression code comprises forming a sequence of coded identifiers arranged in group order. By "arranged in group order", we mean that the identifiers of the compression code are arranged in the same sequence as the respective groups of the first array. Accordingly, in one embodiment the sequence of coded identifiers is arranged so that the identifier categorizing the category of the first group of the first array is positioned at the first location in the compression code and followed thereafter by the identifiers categorizing the categories of the other groups, again in group order. Such an arrangement is preferred since it simplifies identification of an identifier for a particular group, since the location of an identifier for a particular group can be readily determined.

The compression code may be formed substantially simultaneously with the categorizing of each group of the first array.

Preferably, the compression code provides a sequence of identifiers that is collectively equal to the fixed size of a computer word (that is, 32-bits or 64-bits) in length, so as to minimize the cost of storing and processing the sequence using software or dedicated hardware.

In an embodiment, the construction of the second array by selecting entries from the first array depending on the category of a group comprises entering into the second array:

(a) zero entries of the first array for groups in category "0", since the entry that is replicated N/M times in this category was entered into a previous group of the second array;

(b) one entry of the first array for groups in category "1", since all N/M entries in this category are identical;

(c) (N/2*M) entries of the first array for groups in category "2", since only the second (N/2*M) entries differ from the first (N/2*M) entries of the group; and (d) all N/M entries of the first array for groups in category "3", since no compression is possible for this category.

Irrespective of how the compression code is formed, the compression code will include one coded identifier for each group. Thus, if the first array comprises two hundred and fifty six groups, then the compression code will also include two hundred and fifty six identifiers, one for each group.

The present invention also provides a method of retrieving, from a second array, an entry that is equivalent to an entry of a first array indexed by a first index, the second array having a reduced number of entries compared to the first array, the method comprising:

processing the first index to identify a group of entries in the first array containing the entry indexed by the first index;

obtaining a compression code containing, for each group, a coded identifier categorizing a relationship between entries of a respective group, or entries of the respective group and at least one entry of another group;

indexing into the compression code to locate the coded identifier associated with the indexed group of the first array; and deriving, from the coded identifier for the indexed group of the first array and the identifiers for the groups preceding the indexed group, a second index for indexing into the second array to retrieve an entry that is equivalent to the indexed entry of the first array; and retrieving the entry of the second array indexed by the second index.

In an embodiment, the deriving of the second index comprises:

processing the identifiers for groups preceding the indexed group to obtain an index value indicative of the total number of equivalent entries in the second array for the preceding groups; and modifying the index value according to the category of the indexed group to thereby derive the second index.

The present invention also provides a system for constructing, from a first array of entries, a second array of entries having a reduced number of entries compared with the first array, the method comprising:

an input for receiving the first array containing plural array entries;

a processing unit;

a computer readable memory containing program instructions executable by the processing unit to:

partition the first array into one or more groups of entries;

categorize each group with a category categorizing relationships between entries of a respective group, or entries of a respective group and at least one entry of another group;

form a compression code containing a sequence of coded identifiers, each identifier identifying the category of a respective group; and construct the second array to include selected entries from the first array, the selected entries depending on the category of each group and arranged so as to be indexable by processing a first index into the first array, and the compression code to derive a second index for retrieving an entry from the second array that is equivalent to the indexed entry of the first array, without decompressing the second array.

The present invention also provides a computer readable memory containing program instructions executable by a processing unit to:

partition a first array containing plural entries into one or more groups of entries;

categorize each group with a category categorizing relationships between entries of a respective group, or entries of a respective group and at least one entry of another group;

form a compression code containing a sequence of coded identifiers, each identifier identifying the category of a respective group; and construct a second array including selected entries from the first array, the selected entries depending on the category of each group and arranged so as to be indexable by processing a first index into the first array, and the compression code to derive a second index for retrieving an entry from the second array that is equivalent to the indexed entry of the first array, without decompressing the second array.

The present invention also provides a method of deriving, from a first index into a first array containing plural groups of entries and a compression code containing for each group of the first array a coded identifier categorizing a relationship between entries of a respective group, or entries of the respective group and at least one entry of another group, a second index into a second array, the method comprising:

processing the first index to identify the group of the first array containing the entry indexed by the first index;

indexing into the compression code to retrieve the identifier associated with the indexed group of the first array;

processing the identifiers for groups preceding the indexed group to obtain an index value indicative of the total number of equivalent entries in the second array for the preceding groups; and modifying the index value according to the category of the indexed group to thereby derive the second index.

The present invention also provides a computer readable memory storing:

a compression code containing a sequence of coded identifiers, each identifier categorizing a relationship between entries of a respective group, or entries of the respective group and at least one entry of another group;

a second array containing entries that are retrievable therefrom using an index into the second array, the second entry containing a reduced number of entries compared to the first array; and computer software code executable by a processor to:
 receive a first index into the first array;
 process the first index to identify the group of the first array containing the entry indexed by the first index;
 index into the compression code to retrieve the identifier associated with the indexed group;
 process the identifiers for groups preceding the indexed group to obtain an index value indicative of the total number of equivalent entries in the second array for the preceding groups;
 modify the index value according to the category of the indexed group to thereby derive the second index; and
 index the second index into the second array to retrieve therefrom an entry that is equivalent to the indexed entry of the first array.

The present invention also provides a system for indexing into a second array to retrieve therefrom an entry that is equivalent to an indexed entry of a first array containing plural groups of entries, the system comprising:

an input for accepting:
 a first index into the first array; and
 a compression code including a sequence of identifiers categorizing, for each group, a relationship between entries of a respective group of the first array, or entries of the respective group and at least one entry of another group;

a processing unit; and a computer readable memory containing program instructions executable by the processing unit to:
 process the first index to identify the group of the first array containing the entry indexed by the first index;
 index into the compression code to retrieve the identifier associated with the indexed group;
 process the identifiers for groups preceding the indexed group to obtain an index value indicative of the total number of equivalent entries in the second array for the preceding groups;
 modify the index value according to the category of the indexed group to thereby derive the second index; and
 index the second index into the second array to retrieve therefrom an entry that is equivalent to the indexed entry of the first array.

The present invention also provides a computer readable media storing computer software code executable by a processor to:

receive a first index into a first array containing array entries;

process the first index to identify a group of entries of the first array containing an entry indexed by the first index;

index into a compression code including a sequence of identifiers categorizing, for each group of the first array, a relationship between entries of a respective group of the first array, or entries of the respective group and at least one entry of another group, to retrieve an identifier associated with the indexed group;

process the identifiers for groups preceding the indexed group to obtain an index value indicative of the total number of equivalent entries in the second array for the preceding groups;

modify the index value according to the category of the indexed group to thereby derive a second index; and index the second index into a second array to retrieve therefrom an entry that is equivalent to the indexed entry of the first array.

The term "computer readable memory" as used throughout this specification refers to any medium that participates in providing instructions to a processor for execution. Such a medium may include many forms, including, but not limited to, non-volatile media, volatile media and transmission media. Non-volatile memory includes, for example, optical or magnetic disks, such as a hard disk drive storage device. Volatile memory includes dynamic memory. Transmission media includes, for example, coaxial cables, copper wire and fibre optics. Transmission media may also take the form of acoustic or light waves.

Common forms of computer readable media include, for example, CD-ROM, DVD, RAM, PROM, EPROM, FLASH-EPROM, any other memory chip or cartridge. Various forms of computer readable media may be involved in the execution of one or more instructions. For example, the instructions may initially be carried on a hard disk drive of a computer. The computer may then load the instructions into dynamic memory and send the instructions to a remote computer over a transmission line. The remote computer may receive and execute the instructions.

BRIEF DESCRIPTION OF THE DRAWINGS

The present invention will now be described in relation to preferred embodiments as illustrated in the accompanying drawings. However, it is to be understood that the following description is not to limit the generality of the above description.

FIG. 5 is an example application of a method embodiment to a simple first array;

FIG. 6 is an example application of a method embodiment to a simple first array;

FIG. 7 is an example application of a method embodiment to a simple first array;

FIG. 9A to FIG. 9C depict an example of the application of the method embodiment of FIG. 8 to a simple data structure;

FIG. 11A and FIG. 11B are code fragments for a method embodiment of a retrieval algorithm according to the present invention that can be used to perform a radix trie look up from a radix trie subtable based on an entry retrieved from a higher level subtable;

FIG. 12 is an example application of the retrieval algorithm of FIG. 11A and FIG. 11B;

DETAILED DESCRIPTION OF AN EMBODIMENT

Figure 1:
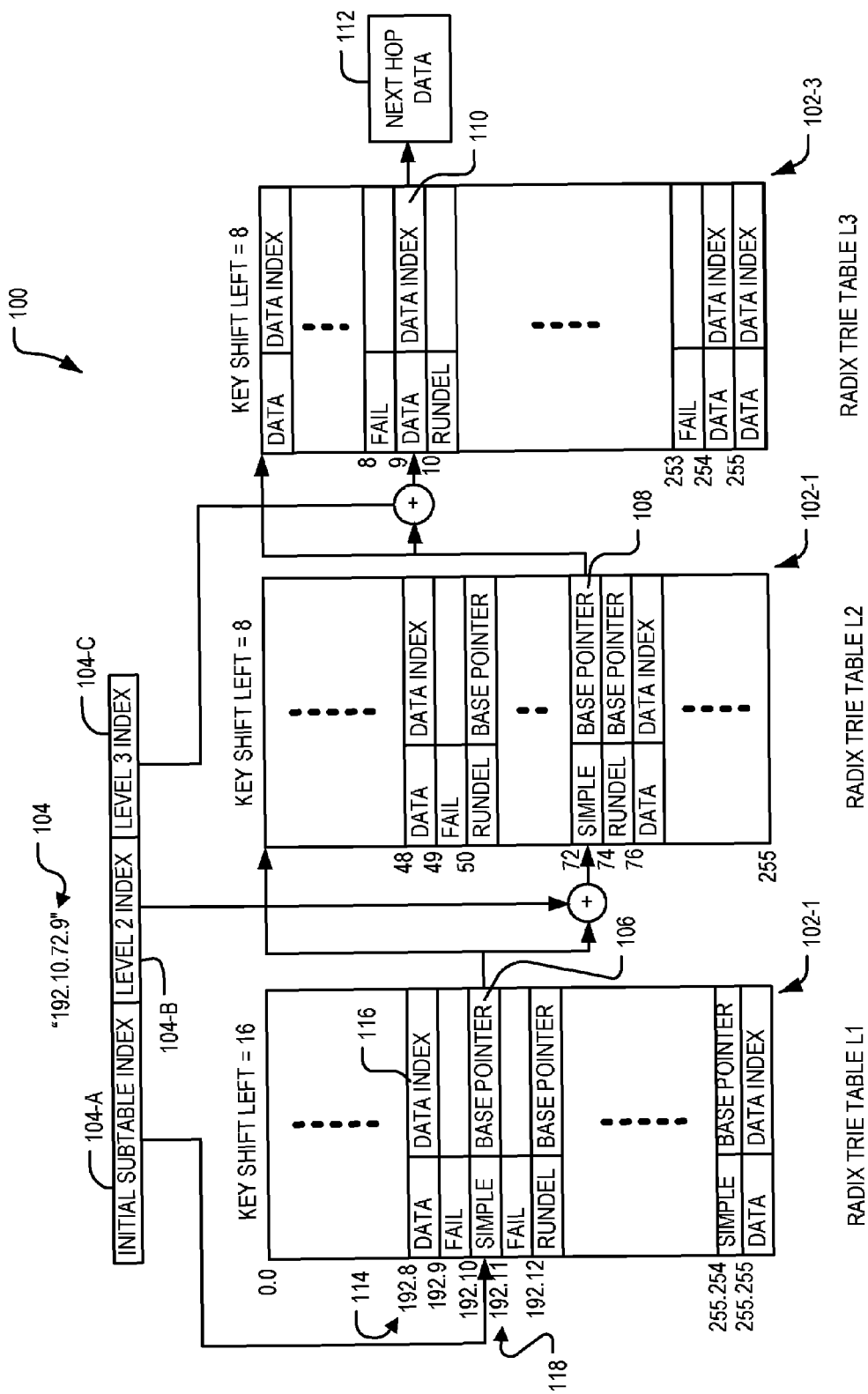
FIG. 1 is an example structure of a radix trie data structure.

The following description describes various embodiments in relation to applications that perform longest matching prefix look up for a given index (or search key), using "longest-prefix match tables" and a search algorithm based on radix tries.

Throughout this specification, references to "longest-prefix match tables" are to be understood as a reference to a data structure that includes plural trie nodes in the form of contiguous arrays of subtable entries. In that structure, subtable entries link recursively to subsidiary subtables via base pointers to form n-way tries composed of a plurality of subtables. A single subtable is thus an array containing entries, which in the present case include entries of a particular entry type.

In the present case, during a longest matching prefix look up, a given search key is consumed by a search engine implementing a search algorithm from left to right, by up to sixteen bits per subtable. However, it will be appreciated that as few as 1-bit and as many as the total number of key bits can be consumed on each subtable index step, as governed by the power-of-two size of each subtable level. Each portion of the search key indexes a subtable of N entries to retrieve an entry having an associated entry type field that distinguishes different kinds of entry, and preferably also indicates the linked subtable to be either compressed or not. Where the linked subtable is compressed, the entry also includes associated compression information for the linked subtable. In the present case the compression information is in the form of a compression code.

In view of the above, and in general, a radix trie table entry intended for longest-prefix match applications would contain, in addition to a pointer/index to a linked subtable, an entry type field and a compression code. In the present case, the entry type field will be referred to as the "ETYPE".

In terms of the format of an entry, any suitable entry format and flag layouts may be used. For example, the compression information may be stored either outside of the table (for example, in a subsidiary data structure) or as part of the entry. However, it is preferred that the compression information forms a part of the entry so the retrieval of an entry also retrieves the compression code ahead of time should it be required.

The ETYPE of the indexed subtable entry is also used by the search engine to determine either a failure (that is, no further searching required), a successful match (that is, the longest-prefix has matched entirely), or an additional trie traversal (that is, the longest-prefix has matched this far, but without conclusion).

In a longest matching prefix look up application, the below described embodiment of the present invention employs a longest prefix table structure that includes compressed subtables. That is, an embodiment of the present invention employs a longest prefix table structure having one or more subtables of a reduced size as compared with the subtables of a conventional longest-prefix table structure that typically contain largely redundant data. The described embodiment also employs a search algorithm that provides for computationally efficient look ups.

Whilst the below description relates to a longest matching prefix look up application, and thus longest prefix table structures, different embodiments may be applicable to other applications.

Turning now to FIG. 1, there is depicted one example of a longest prefix table structure 100 of the type to which the described embodiment of the present invention applies. As shown, the structure 100 includes plural linked subtables 102-1, 102-2, 102-3. Each of the subtables 102-1, 102-2, 102-3 is associated with a different level "L1", "L2", "L3" within the data structure 100.

Each level "L1", "L2", "L3" may include multiple subtables, although typically level "L1" will be only a solitary subtable forming the root node of the trie. In the present case, FIG. 1 depicts a table structure 100 that is a set of a larger data structure, in that FIG. 1 depicts only an initial L1 subtable 102-1 and two particular L2, L3 subsidiary subtables 102-2, 102-3 respectively that satisfy a specific search path. Again, although not shown in FIG. 1, for clarity purposes it will be appreciated that a complete data structure may include plural L1, L2 and L3 subtables.

In terms of performing a longest matching prefix look up for a given search key, and again with reference to FIG. 1, in a conventional longest matching prefix look up the first sixteen bits of the search key, in this example IP address 104, (in this example, "192.10.72.9") forms an initial subtable index 104-A (in this example, "192.10") into the L1 subtable 102-1. In the example, the result is an L2 entry in the form of a subtable base pointer 106 categorizing the start of the L2 subtable 102-2. The next eight bits of the IP address 104 (in this example, "72") are then added to the base pointer 106 to form a "level 2" 104-B index into the L2 subtable 102-2.

The L2 subtable entry 108 is also a base pointer, this time to the start of an L3 subtable 102-3. The last eight bits 104-C of the IP address 104 (in this example, "9") are then added to the base pointer 108 to form an index into the L3 subtable 102-3 to obtain, as a result, an L3 subtable entry 110 indexed by the last eight bits 104-C of the IP address 104.

The L3 subtable entry 110 contains the data index for the full thirty-two bit route (in this example, "192.10.72.9"). Thus, the final step is to use the data index to access the data pool and retrieve the next hop data 112.

FIG. 1 also depicts other examples of radix trie look ups. For example, a SIMPLE subtable lookup for an IP address such as, for example, "192.8.*.*" 114 would return a data index 116 for the sixteen-bit route "192.8" immediately. On the other hand, a look up for an IP address 118 such as, for example, "192.11.*.*" would result in a FAIL entry type and the lookup would fail. Finally, a look up for a shorter IP address of the form such as, for example, "192.10.72.0" would return the data index for the twenty-four bit route "192.10.72" from the lookup of entry "0" in the L3 subtable 102-3.

In view of the foregoing examples, and in general terms, a conventional general radix-trie longest prefix match algorithm proceeds as follows:

(1.) Indexing a predefined number of most significant bits of the IP address into the L1 subtable. The result of this access is either a pointer to associated data, or another trie subtable entry, comprising:

(a.) the base address of the next subtable (BASE) that holds all the prefixes that are extensions of the prefix from step (1);

(b.) the number of bits of the IP address decoded to select an entry from the next subtable (that is, log2 of the uncompressed subtable size, (KEYSHL+1));

(c.) the compression format of the subtable (ETYPE);

(d.) the entropy encoding (ENTROPY) used to compute a random-access into the compressed subtable.

(2.) If the result of the previous step is:

(a.) ETYPE=FAIL, then there is no match and a miss is returned;

(b.) ETYPE=DATA, then BASE points to the key's associated data—go to step 3;

(c.) For all other ETYPEs, decode the next address, retrieve a new encoded entry, and repeat step (2).

(3.) Finally, dereference the associated data pointer.

Figure 2:
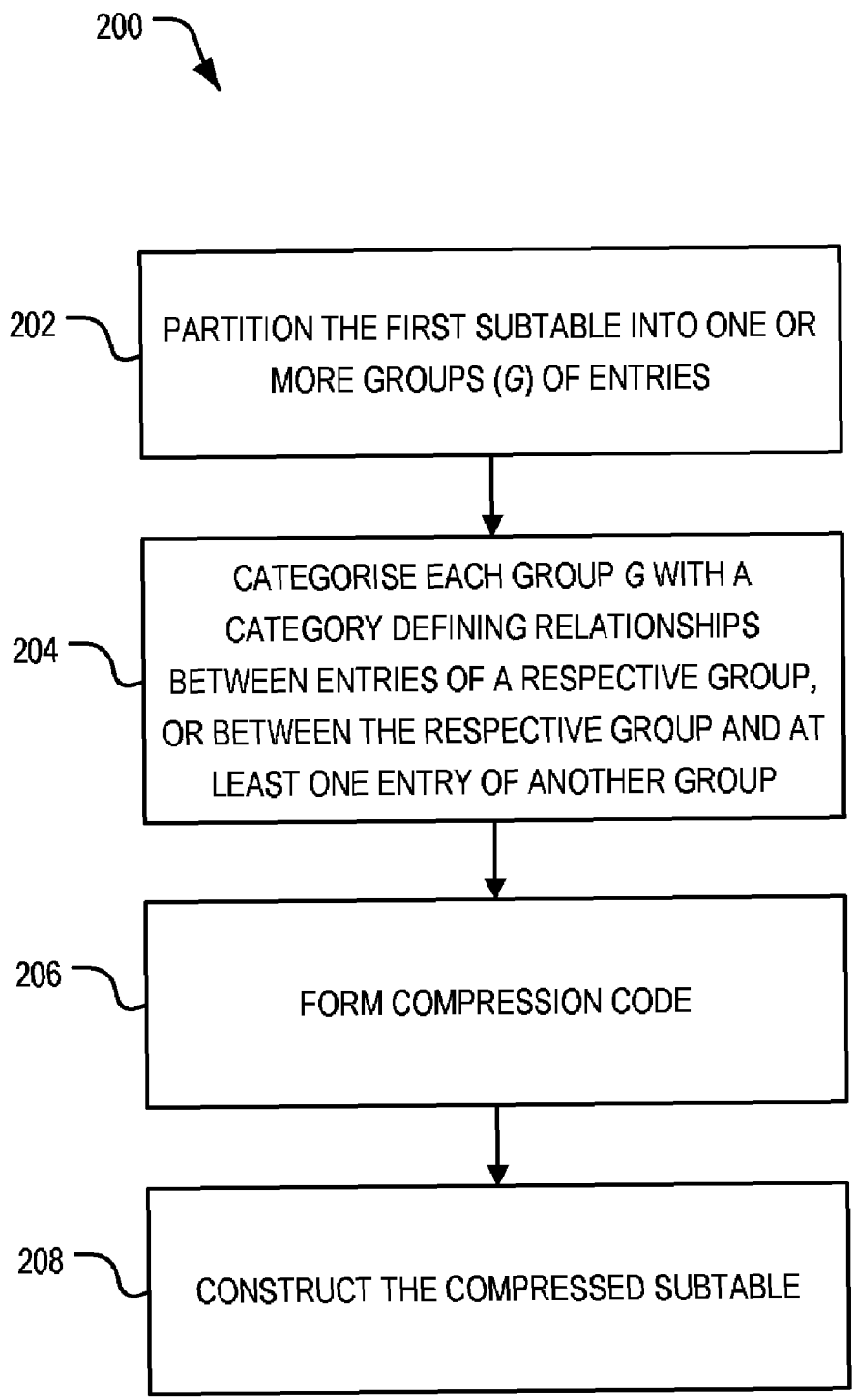
FIG. 2 is a high level flow diagram of a method embodiment for processing a first array to provide a compressed second array.

FIG. 2 depicts a simplified flow-chart for a method 200 embodiment of the present invention. The method 100 constructs, from a first subtable of entries, a second array of entries having a reduced number of entries compared with the first subtable. That is, the method 100 constructs a second array that is a compressed version of the first subtable. Thus, for the remainder of this description, the second array will simply be referred to as the "compressed subtable". Although compressed, the compressed subtable is indexable to retrieve from that subtable an entry that is equivalent to an indexed entry of the first subtable, without decompressing the compressed subtable.

With reference to the flow diagram of FIG. 2, at step 202 the first subtable is partitioned into one or more groups G of entries. In an embodiment, the first subtable is partitioned into equal sized groups G of entries. Thus, in an embodiment, for a first subtable containing an even number N of entries, the partitioning of the first subtable into equal sized groups G is achieved by partitioning the first subtable into N/M groups, where M is the number of entries per group G. In addition, each group G will have a fixed number of entries M that is a power of two, so that multiplication, or division, by M can be accomplished via an appropriate binary shift operation since such operations are economical computationally. For example, for groups of fixed size M, a division operation may be used to identify the group G, and thus the respective identifier, of the first subtable containing an entry indexed by the index I into the first subtable, as G=I/M.

At step 204, each group G of the first subtable is categorized with a category categorizing relationships between entries of a respective group, or entries of the respective group G at least one entry of another group. In the present case, each group G is categorized as one of four categories and the categorisation of each group is performed as follows:

(a) a group G is categorized as a first category (category "0") if all of its entries are identical to the last entry in the preceding group, (G−1);

(b) a group G is categorized as a second category (category "1") if all of its entries are identical to each other, but different to the last entry in the preceding group, G−1;

(c) a group G is categorized as a third category (category "2") if its first (N/2*M) entries are identical to each other and match the last entry in the preceding group, (G−1); and (d) any other group is categorized in a fourth category (category "3").

At step 206, a compression code is formed containing a sequence of identifiers, each identifier identifying the category of a respective group G. In the present case, the compression code includes a sequence of binary coded identifiers in the form a 2-bit binary code. Within the compression code, a different 2-bit binary code is assigned to and representative of a respective category. In the present case, the category of each group is represented using the following two-bit binary code:

(a) category "0" is represented by the dibit identifier "00";

(b) category "1" is represented by the dibit identifier "01";

(c) category "2" is represented by the dibit identifier "10"; and (d) category "3" is represented by the dibit identifier "11".

Finally, at step 208, the compressed subtable is constructed to include entries selected from the first subtable according to the category of each group of the first subtable. In the present case, the construction of the compressed subtable, by selecting entries from the first subtable according to the category of a group, includes entering into the compressed subtable:

(a) zero entries of the first subtable for groups in category "0", since the entry that is replicated N/M times in this category was entered into a previous group of the compressed subtable;

(b) one entry of the first subtable for groups in category "1", since all N/M entries in this category are identical;

(c) (N/2*M) entries of the first subtable for groups in category "2", since only the second (N/2*M) entries differ from the first (N/2*M) entries of the group; and (d) all N/M entries of the first subtable for groups in category "3", since no compression is possible for this category.

Thus, at the completion of the above described method embodiment, a compressed subtable is provided together with a compression code.

Figure 3:
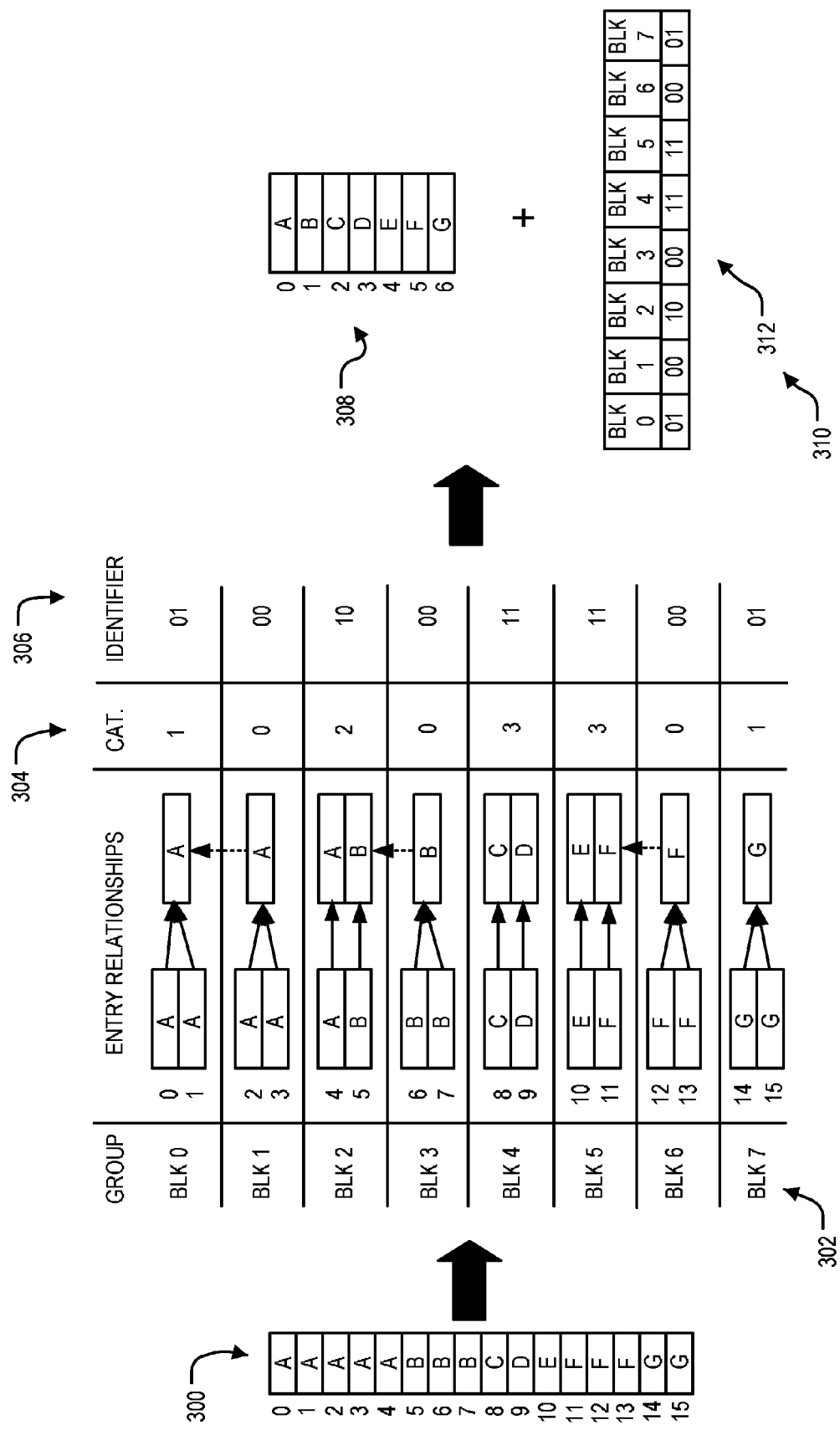
FIG. 3 is a block diagram for an example of the application of a method embodiment to a simple data structure.

FIG. 3 depicts a simple example of the application of the above-described method embodiment. Here, a first subtable 300 contains sixteen entries (that is, N=16) which, in this example, have been represented for simplicity as alphabetic characters. Thus, it is to be appreciated that each alphabetic character is a simplified representation of a subtable entry, such as an entry of the types illustrated in FIG. 1. In other words, each alphabetic character is a simplified representation of a 32-bit or 64-bit entry.

The first subtable 300 is an uncompressed subtable. To compress the first subtable 300, its N entries, in this case numbered "0", "1", "2", . . . , "15", are partitioned into eight (that is, M=8) groups 302 so that each group contains two entries. Each of the groups 302 falls into one of four categories for compression, depending on its amenability for encoding.

Relationships between entries of each group are analyzed and each group classified as one of the four following categories:

(1) A group G is classified as category "0" if all of its entries are identical to the last entry in the preceding group, G−1;

(2.) A group G is category "1" if all of its entries are identical to each other, but different to the last entry in the preceding group, G−1;

(3.) A group G is category "2" if only its first N/2*M entries are identical to each other and match the last entry in the preceding group, G−1; and
(4.) Any other group G is category "3", and not compressible.

Column 304 depicts the categories for the groups G. Note, for the special case of the first group (in this case, "BLK0"), only categories "1" and "3" are possible. Thus, in the present case, since the entries of "BLK0" are identical, and there is no previous group, "BLK0" is classified as a "category 1" group.

In relation to "BLK1", since the entries of that group are identical to each other and to the last entry of "BLK0", "BLK0" is classified as a category "0" group. Furthermore, since the first N/2*M entries of "BLK2" are identical to each other and identical to the last entry in the previous group, BLK3 is classified as a "category 2" group. Finally, since the entries of "BLK4" are different to each other and the last entry of the previous group, "BLK4" is classified as a "category 3" group.

As shown in column 306, the category of each group G, designated "0" to "3", is represented using an identifier. In the example depicted in FIG. 3, the identifier is a two-bit binary identifier code ("the dibit") and in accordance with that scheme:
(1.) category "0" groups are represented by the dibit "00";
(2.) category "1" groups are represented by the dibit "01";
(3.) category "2" groups represented by the dibit "10"; and
(4.) category "3" groups are represented by the dibit "11".

The actual encoding of the categories into dibits is arbitrary, but it has been found that the above encodings simplify the decompression software algorithm.

As shown, the M dibit identifiers are concatenated together into a 2*M-bit binary word 310 to form the compression code 312 associated with the compressed subtable 308. In a radix trie look up application, the compression code 312 is stored as part of the subtable entry pointing to the compressed subtable, in this case the compressed subtable 308. Later, the compression code 312 will be used for deriving an uncompressed subtable index—for example, part of an IP address—into an equivalent index in the compressed subtable 308.

Finally, the compressed subtable 308 is constructed so to include entries selected from the first subtable 300 according to the category 304 of each group, and to thus reduce the size of M groups, as follows:
(1.) zero entries of the first subtable 300 are entered in the compressed subtable 308 for groups in "category 0", since the value being replicated N/M times in this category was stored in a previous group;
(2.) one entry of the first subtable 300 is stored in the compressed subtable for groups in "category 1", since all N/M entries in this category are identical;
(3.) N/2*M entries of the first subtable 300 are stored in the compressed subtable 308 for groups in "category 2", since only the second N/2*M entries differ from the first N/2*M entries of the group;
(4.) all N/M entries of the first subtable are stored in the compressed subtable for groups in "category 3", since no compression was possible for this category.

Advantageously, the compressed subtable 308 is constructed so that the entries of the compressed subtable 308 are indexable, using a second index derived by processing an index into the first subtable 300 and the compression code 312, to retrieve from the compressed subtable 308 an entry corresponding to the indexed entry of the first subtable 300, without decompressing the second subtable 308.

Figure 4:
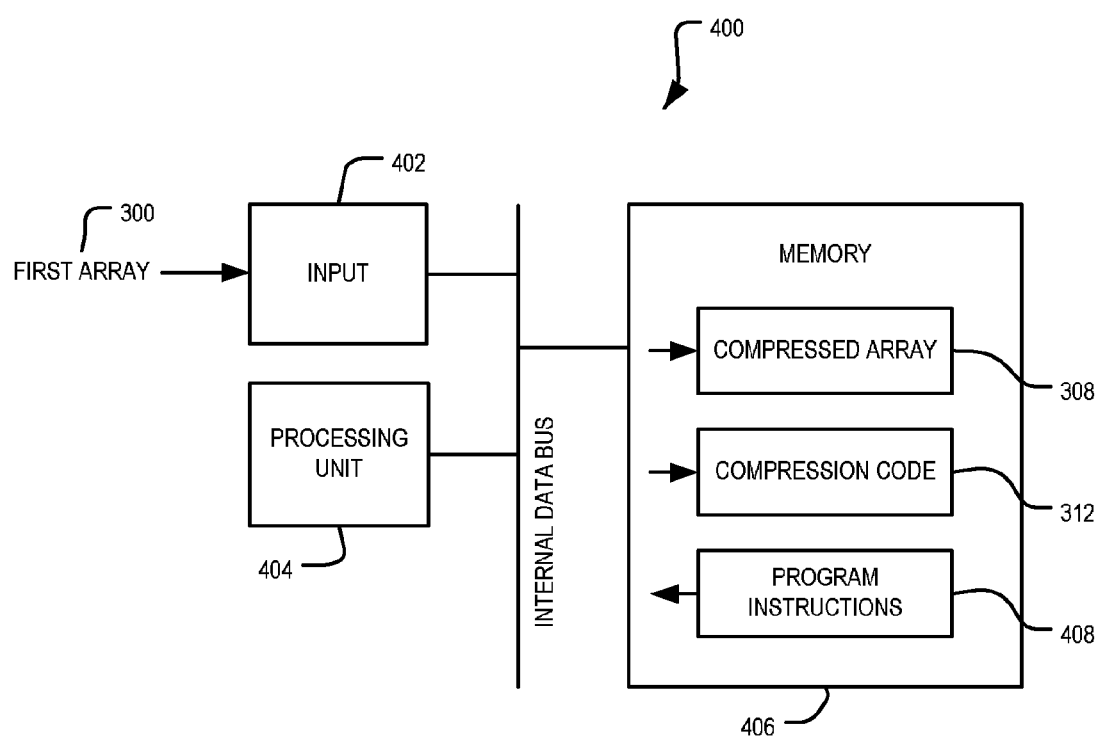
FIG. 4 is a block diagram of a system embodiment for constructing a compressed, second array from an uncompressed first array.

A system 400 embodiment for implementing the above-described method is depicted in the block diagram of FIG. 4.

The system 400 includes an input 402, a processing unit 404 and a computer readable memory 406. The computer readable memory 406 includes program instructions 408, which when executed by the processing unit 404, instruct the processing unit 402 to process an input first array 300, using the above-described method, to construct the compressed array 308 and the compression code 312.

FIG. 5 to FIG. 7 depict three further examples of the application of the above-described method. In particular, FIG. 5 depicts an example of the compression of a first subtable 300 having an uncompressed size of sixty four entries that are partitioned as groups of four entries, some of which include "runs" of entries. In this example, the first subtable 300 is compressed to provide a compressed subtable 308 containing twelve entries arranged as fully-compressed and uncompressed groups, and a compression code 312.

FIG. 6 depicts an example of the compression of a first subtable 300 having an uncompressed size of sixty four entries partitioned as groups of four entries, some of which include runs of repeated entries. In this example, the first subtable 300 is compressed to provide a compressed subtable 308 containing nineteen entries arranged in partially-compressed and uncompressed blocks, and a compression code 312.

Finally, FIG. 7 depicts an example of the compression of a first subtable 300 having an uncompressed size of sixty four entries that are partitioned as groups of four entries to, none of which include runs of repeated entries. In this example, the first subtable 300 is compressed to provide a compressed subtable 308 containing thirty-one entries arranged as fully-compressed and uncompressed blocks, and a compression code 312.

In the above examples, each of the sixteen dibits of the compression code 312 is associated with a respective group of the respective first subtable 300 and are encoded as follows:

For the first block (that is, BLK0), encode:
(a) a "01" dibit if the block is stored compressed to a single entry when all $2^{shl-4}$ uncompressed entries are identical;
(b) a "11" dibit if the block is stored fully uncompressed;
Dibits "00" and "10" are not relevant for BLK0, as it is the first block.

For remaining blocks (that is, BLKi, i>0), encode:
(a) a "00" dibit if every entry in block i is identical to the last entry of block (i−1), and no entries are stored in the compressed subtable 308 for block i;
(b) a "01" dibit if block i differs from the last entry of block (i−1), and one entry of block i is stored in the compressed subtable 308 since there is exactly one distinct value in the block;
(c) a "10" dibit if the first $2^{shl-5}$ entries of block i are identical to the last entry of block (i−1), and the second $2^{shl-5}$ entries of block i are stored in the compressed subtable 308;
(d) a "11" dibit if block i differs from the last entry of block (i−1), and all entries of block i are stored in the compressed subtable 308 since there is more than one distinct value in the block.

The high-order two bits of the compression code 312 hold the dibit for BLK0, while BLK15 uses the low-order two bits of the compression code 312. Only BLK0 and the blocks that correspond to non-zero dibits are stored in the compressed subtable 308. All other blocks that correspond to "00" dibits are omitted.

As will be described in more detail below, each "00" dibit causes the most recently encountered entry to be replicated $2^{shl-4}$ times. The function of indexing into the compressed subtable 308, however, is to emulate a given index into the first subtable 300 by mapping it to an equivalent index into the compressed subtable 308 so as to retrieve an entry that would have been indexed by the given index into the first subtable 300.

Figure 8:
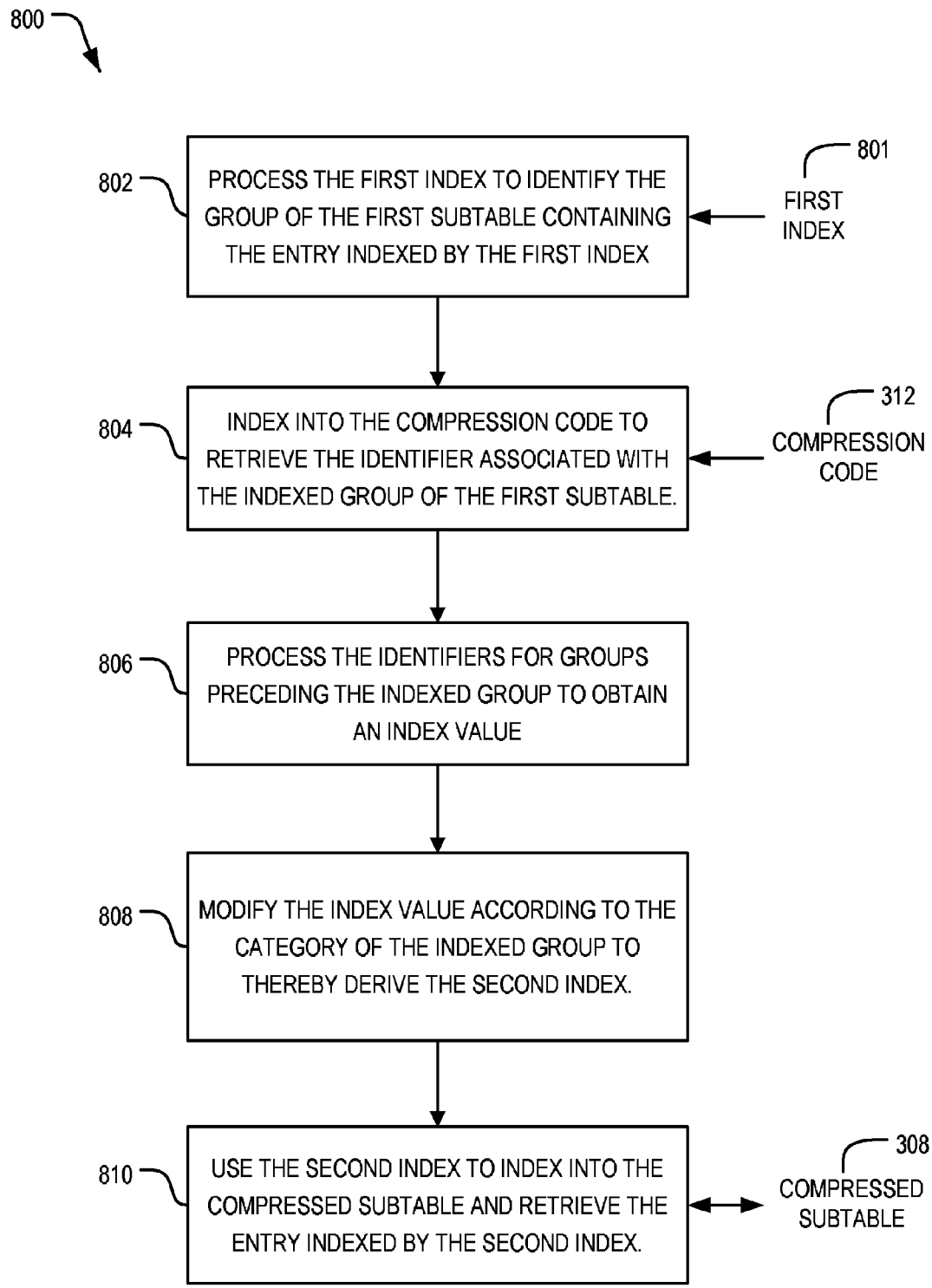
FIG. 8 is a high level flow diagram of a method embodiment for retrieving an entry from a compressed second array that is equivalent to an indexed entry of an uncompressed first array.

In this respect, FIG. 8 depicts a flow diagram 800 for an embodiment that provides a method of retrieving, from a compressed subtable 308, an entry that is equivalent to an entry of a first subtable 300 that has been indexed by a first index 801 into the first subtable 300 (ref. FIG. 3).

As depicted in the FIG. 8, an embodiment of the retrieval method 800 entails processing 802 the first index 801 to identify the group of the first subtable 300 containing the entry indexed by the first index 801 and then indexing 804 into the compression code 312 to retrieve the identifier associated with the indexed group of the first array 300.

Then, by processing 806 the identifiers for groups preceding the indexed group, an index value indicative of the total number of equivalent entries in the second array for the preceding groups is obtained.

The index value is then modified 808 according to the category of the indexed group to thereby derive the second index, which is then used to index 810 into the compressed subtable 308 to retrieve an equivalent entry to that indexed by the first index into the first array.

FIG. 9A to FIG. 9C depict a simple example 900 of a retrieval method in accordance with an embodiment in which four, 4-bit first indexes 801-1, 801-2, 801-3, 801-4 and a compression code 312 are used to derive respective second indexes 902-1, 902-2, 902-3, 902-4.

To assist with the description that follows, the least significant bit (LSB) of each of the first index is shown boxed in FIG. 9A.

As shown in FIG. 9A, the high order three bits of each first index 801-1, 801-2, 801-3, 801-4 determines which of the 8-groups (that is, the sixteen dibits) of the compression code 312 each access falls into, and thus identifies which of the dibit identifiers of the compression code 312 is associated with an indexed group. For example, for first index 801-2, the high order three bits (that is, "010") indicate that the access falls into the group identified as "BLK2".

For each indexed dibit, the total number of entries stored in the compressed subtable 308 (ref. FIG. 9C) before the group indexed by the high order three bits of the first index dibit is counted based on the dibit associated with each of those groups. That is, in the present example, "01" dibit blocks will contain one entry, "10" dibit blocks will contain two entries, and "11" dibit blocks will also contain two entries. "00" dibits are ignored, as these correspond to blocks that were omitted from the compressed subtable 308. Thus, the total count 906 (hereinafter, "entries_skipped") is indicative of the number of entries, from all of the groups preceding the indexed group, having an equivalent entry in the compressed subtable 308 and is thus also indicative of the number of entries to "skip over" in the compressed subtable 308. Advantageously, using a compression code 312 having the previously described encoding scheme, in this simple example each entries_skipped count 906 may be derived simply by counting the number of ones in the prior dibits 908.

In this simple example, the dibit contained in the indexed group is then used to determine whether the least significant bit of each first index are needed to complete the derivation of that second index, as follows:

(a) If the indexed dibit indicates "00", then the second index is calculated as entries_skipped−1 to index the previous entry, that is, the last repeated entry;

(b) If the indexed dibit indicates "01", then the second index is calculated as entries_skipped so as to index the stored entry;

(c) If the indexed dibit indicates "10" and if the least significant bit the index is set, the second index is calculated as entries_skipped, otherwise the second index is calculated as entries_skipped−1 to index the last repeated entry;

(d) If the indexed dibit indicates "11", then the second index is calculated by adding the least significant bit of the keyBits to entries_skipped to index into the indexed block.

Figure 10A:
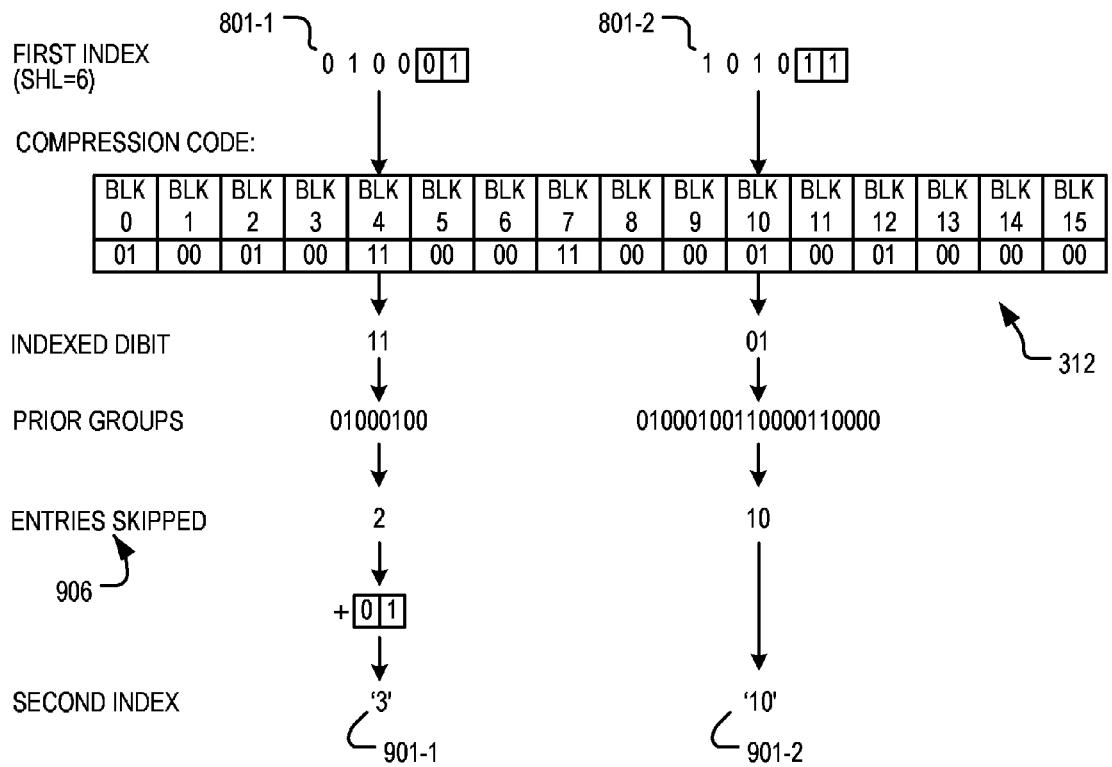
FIG. 10A to FIG. 10B depict another example application of the method embodiment of FIG. 8 to another simple data structure.
Figure 10B:
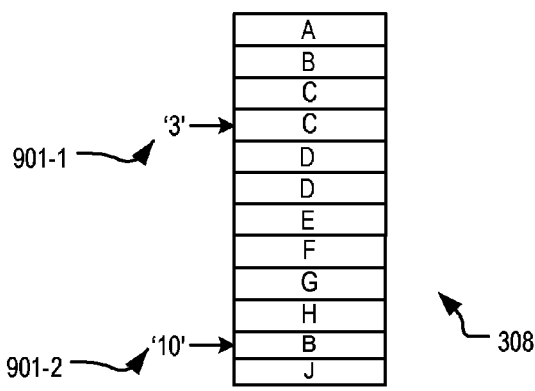

FIG. 10 depicts a more complex example of method embodiment process that converts two thirty-two bit first indexes 801-1, 801-2 into an equivalent second index 901-1, 901-2 using a compression code 312. In this example, each pair of bits, or dibit, in the compression code 312, corresponds to one group of the first subtable 300 shown in FIG. 5.

In this example the high order four bits ("the block number") of each first index 801-2, 801-2 determine which of the sixteen blocks (BLK0 to BLK 15) of the compression code 312 each access falls into. The four bit block number is used to index one of BLK0-BLK15 in the thirty-two bit compression code, starting from the left for BLK0.

For each dibit before the dibit indexed by the block number, the total number of equivalent entries in the compressed subtable is determined according to the dibit categorizing each of those blocks. Thus, in this example, "01" dibit blocks have one entry in the compressed subtable, "10" dibit blocks have $2^{shl-5}$ equivalent entries in the compressed subtable, and "11" dibit blocks have $2^{shl-4}$ equivalent entries. "00" dibits are ignored, as these correspond to blocks that were omitted from the compressed subtable. In this example, the number of "1" bits in the compression code is used to determine how many N/2*M entries, or lots of a single entry, are present. Again, the total count (hereinafter, "entries_skipped") 906 is an index value that is indicative of the total number of equivalent entries in the second array for the groups of the first array preceding the group containing the indexed entry and is thus also indicative of the number of entries to "skip over" in the compressed subtable.

The dibit indexed by the block number is then used to determine whether the low-order bits of first index 801-1, 801-2 are needed to complete modify the index value and thus derive each second index 901-1, 901-2 as follows:

(a) If the indexed dibit indicates "00", then the second index will be calculated as entries_skipped−1 to index the previous entry, that is, the last repeated entry;

(b) If the indexed dibit indicates "01", then the second index will be calculated as entries_skipped so as to index the stored entry;

(c) If the indexed dibit indicates "10" and if ((shl−4) least significant bits of keyBits)$\geq 2^{shl-5}$, then the second index is calculated by adding the (shl−5) least significant bits of the keyBits to entries_skipped to index into the second half of the current block, otherwise entries_skipped−1 indexes the last repeated entry;

(d) If the indexed dibit indicates "11", then the second index is calculated by adding the (shl−4) least significant bits (which in this example is two least significant bits) to entries_skipped to index into the indexed block.

The above described embodiments of retrieval methods may be implemented in software or hardware. In this respect, FIG. 11A and FIG. 11B provides code fragments, in C language, for an embodiment of the retrieval algorithm that can be used to perform a radix trie look up from a radix trie subtable based on an entry retrieved from a higher level subtable.

With reference initially to FIG. 11A, entry is the entry of the higher level subtable being examined, searchKey is the first index (in this case, a search key), and tablespace is an array of memory occupied by the subtable. In this example, each entry comprises sixty-four bits and is structured in accordance with table 1.

With reference to table 1, a "FAIL ETYPE" indicates that a null leaf (no matching prefix) has been reached, in which case the data word is ignored, and the look up terminates.

A "DATA ETYPE" indicates that a valid leaf (best matching prefix) has been reached. The "BASE" field is the index of the data pool entry that contains the Next Hop data.

A "SIMPLE" subtable type indicates that the subtable at the next level is uncompressed in which case the "ENTROPY" field is ignored. Normally, SIMPLE is only used for the initial subtable (that is, the highest level subtable) of a compressed radix trie table (CRT) structure, although a simple CRT table can comprise SIMPLE subtables at all levels of the trie if it is densely populated. A run-length and delta coded compressed trie ETYPE combines delta and run length encodings to compress the subtable. The shl value indicates the size of the first subtable and thus is also indicative of the number of bits in the first index.

With reference again to FIG. 11A, the function high_order_bits(K, N) returns a bit vector of the N most significant bits of K. Initially, entry is set to point to the initial SIMPLE subtable, which is always assumed to start at index "0".

TABLE 1

| Bit | Name | Description |
|---|---|---|
| 0-31 | ENTROPY | Compression code encoding bits for compressing the linked subtable. The compression code allows the search algorithm to convert any desired offset in the uncompressed subtable into the appropriate offset in the compressed subtable without having to read any of the compressed subtable contents. The interpretation of ENTROPY is dependent on ETYPE. |
| 32-55 | BASE | Subtable Base Address. This is the beginning 64-bit address where the subtable is stored, or the index of the Data entry in the case where next hop data is accessed. Subtables are stored in contiguous 64-bit locations starting from here |
| 56-59 | KEYSHL | Key Shift Left. This is the number of key bits, minus one, consumed by the CRT step. Thus, the encoded value ranges from 0-15 to denote consumption of another 1-16 bits of the key. Since this field indicates how many positions to shift-left the key following this CRT stage, it is equal to $\log_2$ of the uncompressed size of the subtable. |
| 60-63 | ETYPE | Entry type. Defines the type of compression used to encode the nature of the data linked to by BASE. See descriptions of each type following in this section.<br>0000 FAIL - Fail entry.<br>0001 DATA - Next hop pointer pointing to a Data entry at index given by BASE.<br>0010 SIMPLE - Next subtable is a simple, uncompressed subtable.<br>0011 Reserved<br>0100 "RUNDEL" Run-length and delta coded compressed trie for CRT.<br>0101-1111 Reserved |

FIG. 11B depicts a code fragment for a function for calculating an index offset for deriving, a second index from the first index. In the present case, the popcount( ) function in the code fragment is a function on integers, n, that returns the count of the population of 1-bits in n represented as a binary word. The three arguments to the offset_RUNDELTA( ) function include entropy, keyBits and keyShl. In the present case, entropy is the compression code (in other words, the field ENTROPY from a CRT table entry), keyBits is the portion of the longest prefix search key currently extracted for indexing a subtable, and keyShl is the $\log_2$ size of the subtable into which keyBits is being indexed. It should be noted that various forms of this function, some more naive with respect to counting entries to skip, and others more sophisticated (for example, exploiting the speed advantage of static lookup tables) would equally accomplish the indexing function.

FIG. 12 depicts an example execution of the code fragment listed at FIG. 11B for deriving a second index 901 (into a compressed array 308) from a first index 801 into a first array 300, and a compression code 312.

In most practical applications of compressed radix tries, such as CRT, software may be used to perform the initial subtable compression step, but retrieval may be performed by a hardware table search engine to permit repeated and rapid look up. In this respect, a schematic diagram 1300 of an embodiment of a hardware table search engine is shown FIG. 13.

Figure 13:
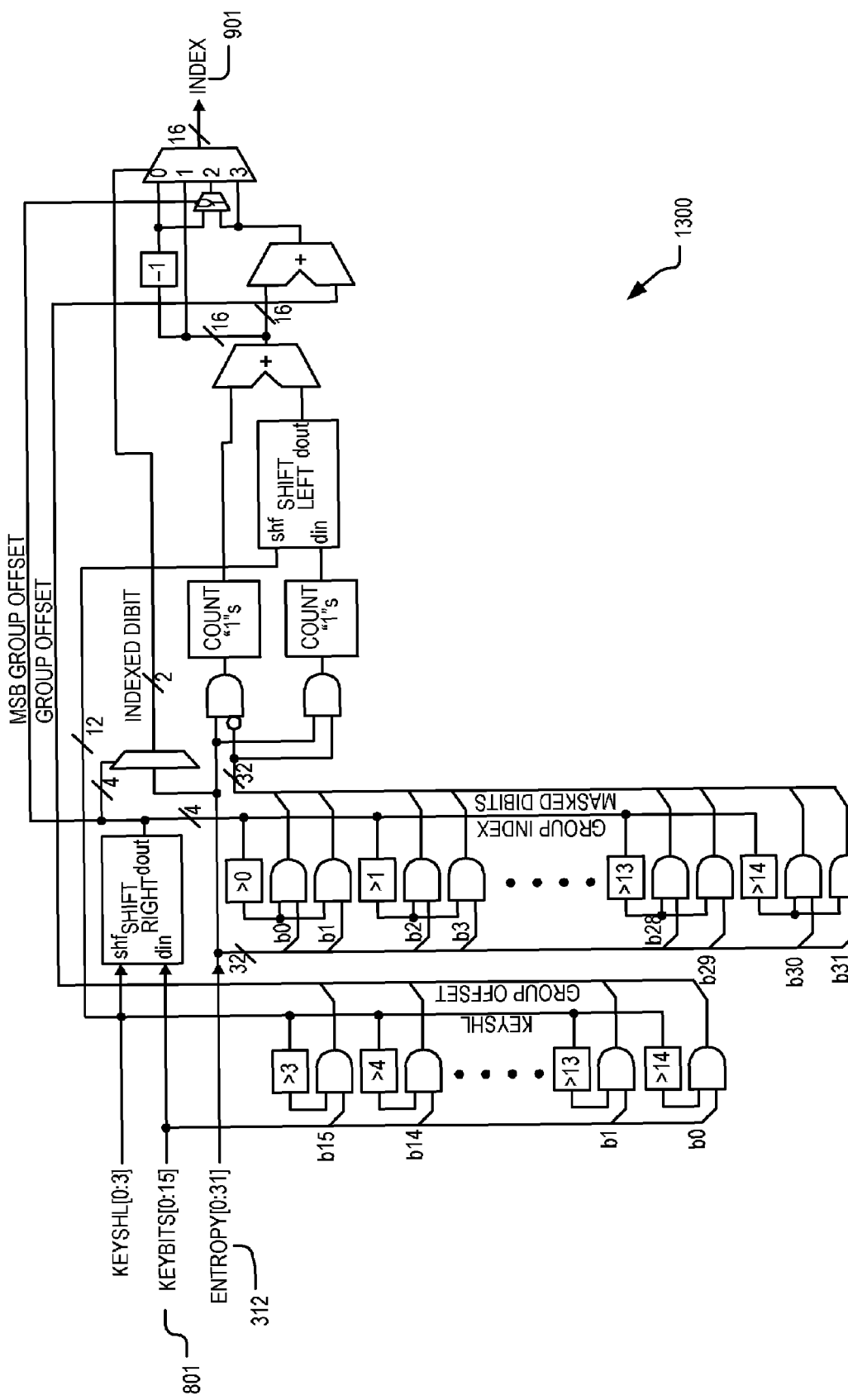
FIG. 13 is a schematic block diagram for a hardware implementation of the retrieval algorithm.

The schematic diagram 1300 depicted in FIG. 13 accepts a sixteen bit first index 801 (KEYBITS) into a subtable of size $2^{KEYSHL+1}$ entries, and a thirty-two bit compression code 312 (ENTROPY) and uses a pair of population count (count "1"s) blocks to sum through the adjacent group sizes and calculate the second index 901. In practice, this circuit can perform retrievals at beyond four hundred million per second in 90 nm CMOS VLSI technologies.

Figure 14:
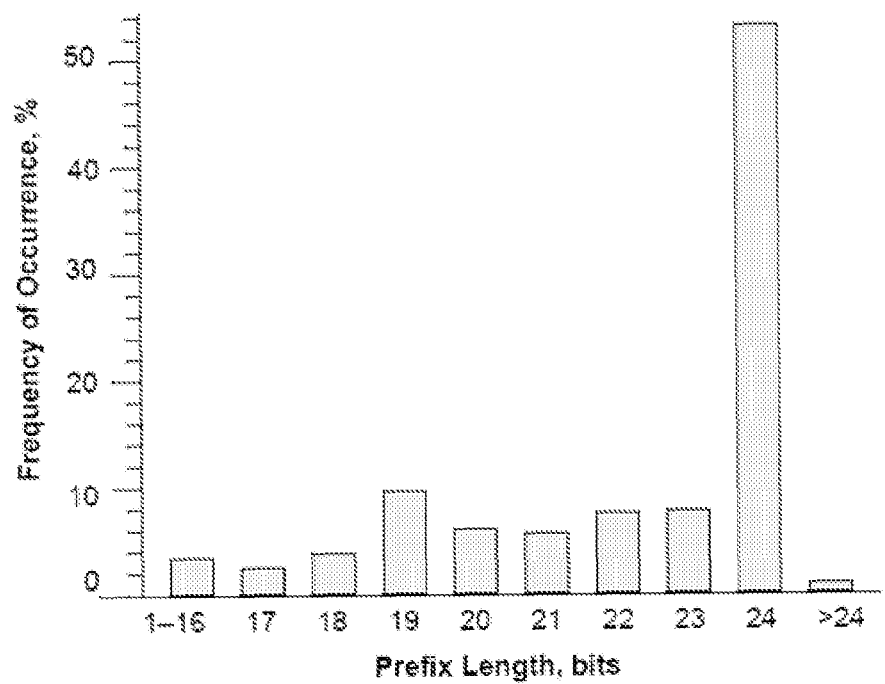
FIG. 14 is a bar graph depicting the distribution of prefix lengths for the MAEWest IP route table.

The performance the above described method of compression was analyzed using a real-world IP route table, MAEWest, containing over ten thousand prefixes. The distribution of prefix lengths, shown in FIG. 14, follows that of most real-world IP route tables: a significant (53%) peak at prefix length 24 bits, a large distribution in the range 17-23 bits, and very few prefixes (<1%) beyond 24 bits. Given the peak at 24-bits, it is unsurprising that most practical radix tries are structured to ensure that 24-bit prefixes can be resolved in just two levels (e.g. using a 16/8 L1/L2 breakdown). The distribution also suggests that very few L3 subtables are needed, as the majority of prefixes are entirely contained in both L1 and L2 subtables.

Figure 15:
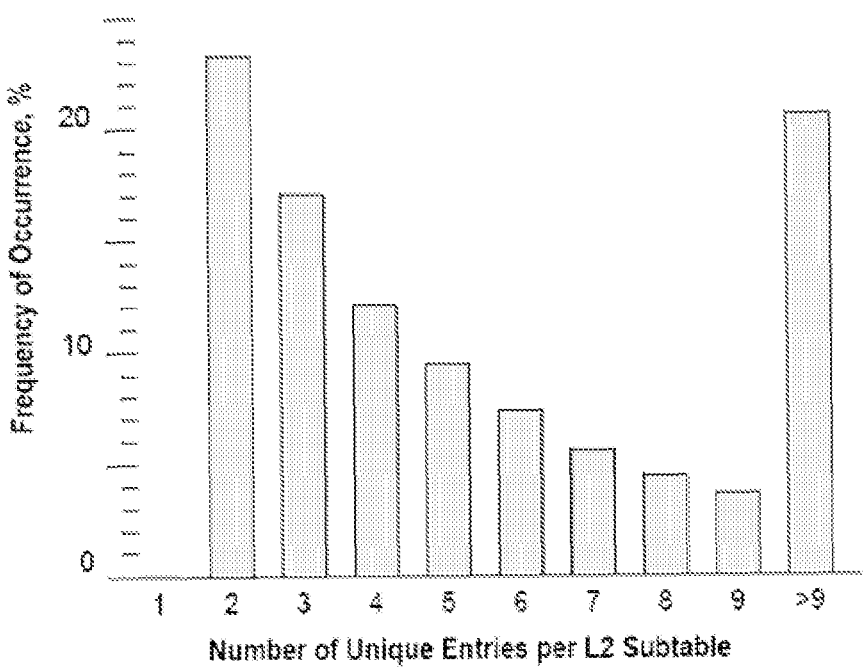
FIG. 15 is a bar graph depicting the distribution of the number of entries for L2 subtables in the MAEWest IP route table.

For a radix trie structured as 16/8/8 bits (32-bit prefixes), the MAEWest database gives rise to rather sparse L2 subtables, as shown in FIG. 15. No subtables consisted of entirely a single entry, but 50% of all L2 subtables contained at most four distinct entries, illustrating that a high degree of redundancy had been introduced by prefix expansion. Prefixes of length nineteen to twenty-three were the most likely to be expanded to fill L2 subtables at the 24-bit boundary.

Compared with prior art in the area of radix trie compression, the present invention achieves superior compression ratios over earlier methods based on single bit binary encodings. As described above, a particular embodiment of the present invention uses dibit encoding to capture essentially four compression opportunities, expressed as the product of compressed vs. uncompressed against run-length vs. delta encoding.

Unlike single-bit binary encodings, dibit encodings allow adaptability in compression across a subtable, taking advantage of self-similarity in some cases (runs) and repetition in other cases (deltas). As described above, the present invention may be realized in software and/or hardware.

Figure 16:
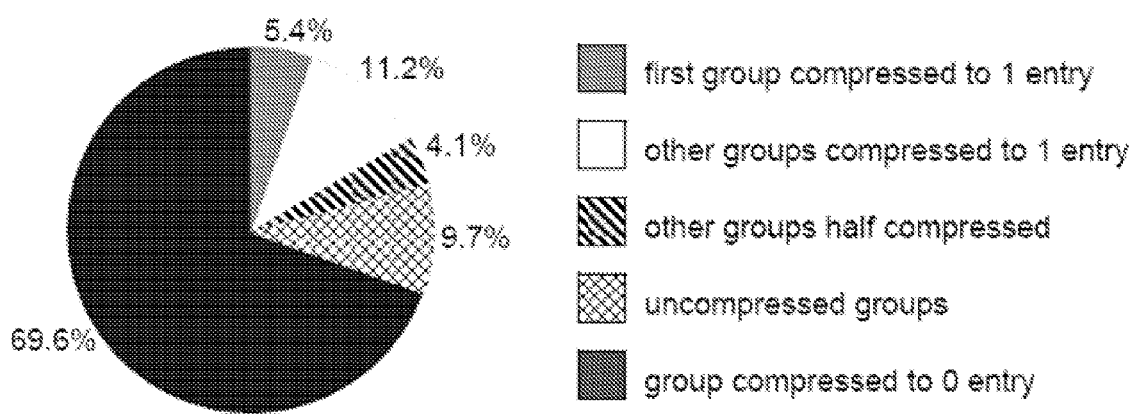
FIG. 16 is a pie chart depicting the results of an example application of the present invention algorithm to the MAEWest IP route table.

A compression method in accordance with an embodiment of the present invention was applied to compress the MAEWest tables. As a result of the compression, the majority of 16-entry groups (for L2, N=256, M=16, M/N=16) were compressible, as shown in FIG. 16. More than 90% of all groups were compressible in some manner (categories "0"-"2"), with the majority of groups (69.6%) being represented by category "0", and no entries stored.

On even a small dataset, the present invention achieved high levels of subtable compression, reducing storage to around a fifth of normal size. Compared with a competitive binary encoding of compression, the present invention showed a 50% advantage.

Such a substantive improvement is expected to confer an economic advantage on network routing equipment employing an embodiment of the present invention.

Whilst the above-described embodiments have been described in terms of applications that relate to radix trie look up applications, it will also be appreciated that there may be other variations and modifications not described herein that are also within the scope of the present invention. For example, the problem of prefix expansion and corresponding subtable size explosion is also observed when radix tries are used to hold Access Control Lists (ACLs). ACLs are used in controlling network access according to a set of rules, and such subtables require long search keys, greater than thirty-two bits, which only exacerbates the problem of table size as more than three levels of subtable are necessary in such cases.

The present invention is expected to be beneficial to compressing ACL radix tries, demonstrating that radix trie compression has broad applicability in networking technology.

The invention claimed is:

1. A method of constructing, from a first array of entries, a second array having a reduced number of entries compared with the first array, the method comprising:
   partitioning the first array into one or more groups of entries, wherein the first array includes N entries and is partitioned into N groups, each group containing N/M entries;
   categorizing each group with a category categorizing relationships between entries of a respective group, or entries of a respective group and at least one entry of another group;
   forming a compression code containing a sequence of coded identifiers, each identifier identifying the category of a respective group; and
   constructing the second array to include selected entries from the first array, the selected entries depending on the category of each group and arranged so as to be indexable by processing a first index into the first array, and the compression code to derive a second index for retrieving an entry from the second array that is equivalent to the indexed entry of the first array, without decompressing the second array.

2. A method according to claim 1 wherein the category is a category selected from one or more of:
   (a) a category categorizing that the entries in a group are identical;
   (b) a category categorizing that the entries in a group are different;
   (c) a category categorizing that at least some of consecutive entries of a group are identical; and
   (d) a category categorizing that at least some of the entries in a group are identical with at least one entry of another group.

3. A method according to claim 1, wherein the construction of the second array by selecting entries from the first array depending on the category of a group G includes entering into the second array:
   (a) zero entries of the first array for each group categorized as having entries that are identical to the last entry in the preceding group, (G−1);
   (b) one entry of the first array for each group categorized as having entries that are identical to each other, but different from the last entry in the preceding group, (G−1);
   (c) (N/2*M) entries of the first array for each group categorized as having its first (N/2*M) entries identical to each other and also identical to the last entry in the preceding group, (G−1); and
   (d) 2* (N/2*M) entries for each other group.

4. A method according to claim 3 wherein the category of each group is identified by a 2-bit binary identifier.

5. A method according to claim 4 wherein each set bit in a 2-bit binary coded identifier is indicative of a respective known number of equivalent entries in the second array that have been selected from the respective group of the first array.

6. A method according to claim 5 wherein:
   (a) each group of the first array having zero entries entered into the second array is identified by the 2-bit identifier "00";
   (b) each group of the first array having one entry in the second array is identified by the 2-bit identifier "01";
   (c) each group of the first array having (N/2*M) entries in the second array is identified by the 2-bit identifier "10"; and
   (d) each group of the first array having 2* (N/2*M) entries in the second array is identified by the 2-bit identifier "11".

7. A method according to claim 1, wherein the first array of entries includes a first sub-table of a longest prefix match table.

8. A method according to claim 1, wherein the second array is a compressed sub-table containing selected entries from the first sub-table and wherein selecting entries from the first sub-table depending on the category of a group includes entering into the compressed sub-table:
   (a) zero entries of the first sub-table for each group categorized as having entries that are identical to the last entry in the preceding group, (G−1);
   (b) one entry of the first sub-table for each group categorized as having entries that are identical to each other, but different to the last entry in the preceding group, (G−1);
   (c) (N/2*M) entries of the first sub-table for each group categorized as having its first (N/2*M) entries identical to each other and also identical to the last entry in the preceding group, (G−1); and
   (d) 2* (N/2*M) entries of the first sub-table for each other group;
   and wherein each category is identified using a dibit identifier.

9. A method of retrieving, from a second array, an entry that is equivalent to an entry of a first array indexed by a first index, the second array having a reduced number of entries compared to the first array, the method comprising:
   processing the first index to identify a group of entries in the first array containing the entry indexed by the first index;
   obtaining a compression code containing, for each group, a coded identifier categorizing a relationship between entries of a respective group, or entries of the respective group and at least one entry of another group;
   indexing into the compression code to locate the coded identifier associated with the indexed group of the first array;
   deriving, front the coded identifier for the indexed group of the first array and the identifiers for the groups preceding the indexed group, a second index for indexing into the second array to retrieve an entry that is equivalent to the indexed entry of the first array; and retrieving the entry of the second array indexed by the second index.

10. A method according to claim 9 wherein the deriving of the second index comprises:

processing identifiers for groups preceding the group containing the indexed entry to obtain an index value indicative of the total number of equivalent entries in the second array for the preceding groups; and modifying the index value according to the category of the indexed group to derive the second index.

11. A method according to claim 10 wherein the derivation of the second index is performed by a table lookup hardware circuit.

12. A method according to claim 11 wherein the table hardware look up circuit includes a pair of population counters, one each for counting the number of least significant bits and the most significant bits set in the 2-bit coded identifiers for the groups preceding the group containing the indexed entry.

13. A method according to claim 9 wherein each coded identifier includes a 2-bit binary coded identifier, and wherein each set bit in a 2-bit coded identifier is indicative of a respective known number of equivalent entries in the second array that have been selected from the respective group of the first array.

14. A method according to claim 10 wherein the index value is obtained by counting the set bits in the 2-bit coded identifiers for groups preceding the indexed group.

15. A method according to claim 9, wherein the first array of entries includes a first sub-table of a longest prefix match table.

16. A method according to claim 15, wherein the second array is a compressed sub-table containing selected entries from the first sub-table and wherein the first index includes a portion of a binary search key, so that the method comprises:

processing the portion of the binary search key to identify a group of entries in the first sub-table containing the entry indexed by the portion of the binary search key;

obtaining a compression code containing, for each group, a 2-bit coded identifier categorizing a relationship between entries of a respective group, or entries of the respective group and at least one entry of another group;

indexing into the compression code to locate the 2-bit coded identifier associated with the group of the first sub-table containing the indexed entry;

deriving, from the 2-bit coded identifier for the indexed group of the first sub-table and the 2-bit identifiers for the groups preceding the indexed group, a second index for indexing into the compressed sub-table to retrieve an entry that is equivalent to the indexed entry of the first sub-table; and retrieving the entry of the compressed sub-table indexed by the second index.

17. A method of deriving, from a first index into a first array containing plural groups of entries and a compression code containing for each group of the first array a coded identifier categorizing a relationship between entries of a respective group, or entries of the respective group and at least one entry of another group, a second index into a second array, the method comprising:

processing the first index to identify the group of the first array containing the entry indexed by the first index;

indexing into the compression code to retrieve the identifier associated with the indexed group of the first array;

processing the identifiers for groups preceding the indexed group to obtain an index value indicative of the total number of equivalent entries in the second array for the preceding groups; and modifying the index value according to the category of the indexed group to derive the second index.

18. A method according to claim 17 wherein each coded identifier includes a 2-bit binary coded identifier and wherein each set bit in a 2-bit coded identifier is indicative of a respective known number of equivalent entries in the second array that have been selected from the respective group of the first array.

19. A method according to claim 18, wherein the first array of entries includes a sub-table of a longest prefix match table.

* * * * *